US012601810B2

(12) United States Patent
Joo et al.

(10) Patent No.: US 12,601,810 B2
(45) Date of Patent: Apr. 14, 2026

(54) DEVICE AND METHOD OF DETECTING FOR HRP UWB RANGING AGAINST DISTANCE REDUCTION ATTACKS

(71) Applicant: KOREA UNIVERSITY RESEARCH AND BUSINESS FOUNDATION, Seoul (KR)

(72) Inventors: Kyungho Joo, Seoul (KR); Yeonseon Jeong, Seoul (KR); Dong Hoon Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 252 days.

(21) Appl. No.: 18/242,743

(22) Filed: Sep. 6, 2023

(65) Prior Publication Data

US 2024/0077574 A1     Mar. 7, 2024

(30) Foreign Application Priority Data

Sep. 6, 2022     (KR) ........................ 10-2022-0113048

(51) Int. Cl.
*G01S 7/02*        (2006.01)
*G01S 13/02*       (2006.01)
*H04W 12/122*      (2021.01)

(52) U.S. Cl.
CPC .......... *G01S 7/021* (2013.01); *G01S 13/0209* (2013.01); *H04W 12/122* (2021.01)

(58) Field of Classification Search
CPC ... G01S 7/021; G01S 13/0209; H04W 12/122
See application file for complete search history.

(56) References Cited

U.S. PATENT DOCUMENTS

| | | | | |
|---|---|---|---|---|
| 10,645,596 | B2 * | 5/2020 | Ghabra | .................. G01S 13/46 |
| 10,715,355 | B2 * | 7/2020 | Baier | .................... G01S 13/765 |
| 2018/0254870 | A1 * | 9/2018 | Dutz | .................... H04L 5/0051 |
| 2021/0084499 | A1 * | 3/2021 | Kuchler | .............. H04L 25/0224 |
| 2023/0345250 | A1 * | 10/2023 | Dutz | .................... H04B 1/7163 |
| 2024/0264263 | A1 * | 8/2024 | Studerus | .............. G01S 5/0284 |

FOREIGN PATENT DOCUMENTS

| | | |
|---|---|---|
| KR | 10-2021-0020616 A | 2/2021 |
| KR | 10-2021-0052161 A | 5/2021 |
| KR | 10-2021-0135643 A | 11/2021 |
| KR | 10-2351586 B1 | 1/2022 |

* cited by examiner

*Primary Examiner* — Marcus E Windrich
(74) *Attorney, Agent, or Firm* — NSIP Law

(57)     ABSTRACT

Disclosed are a device and method for detecting distance reduction attack in an ultra-wide band (UWB) high rate pulse (HRP) mode. The method for detecting distance reduction attack is a method performed by a receiver or transmitter operating in the UWB HRP mode, the method comprising receiving a message frame targeted for distance reduction attack; splitting a scrambled timestamp sequence (STS) field included in the message frame into a plurality of sub-fields; computing a correlation between each of the sub-fields and a corresponding sub-template among a plurality of sub-templates split from a local template; extracting a plurality of maximum peaks, each corresponding to each of the correlations; and detecting the distance reduction attack based on extracted maximum peaks.

6 Claims, 9 Drawing Sheets

Figure 9:
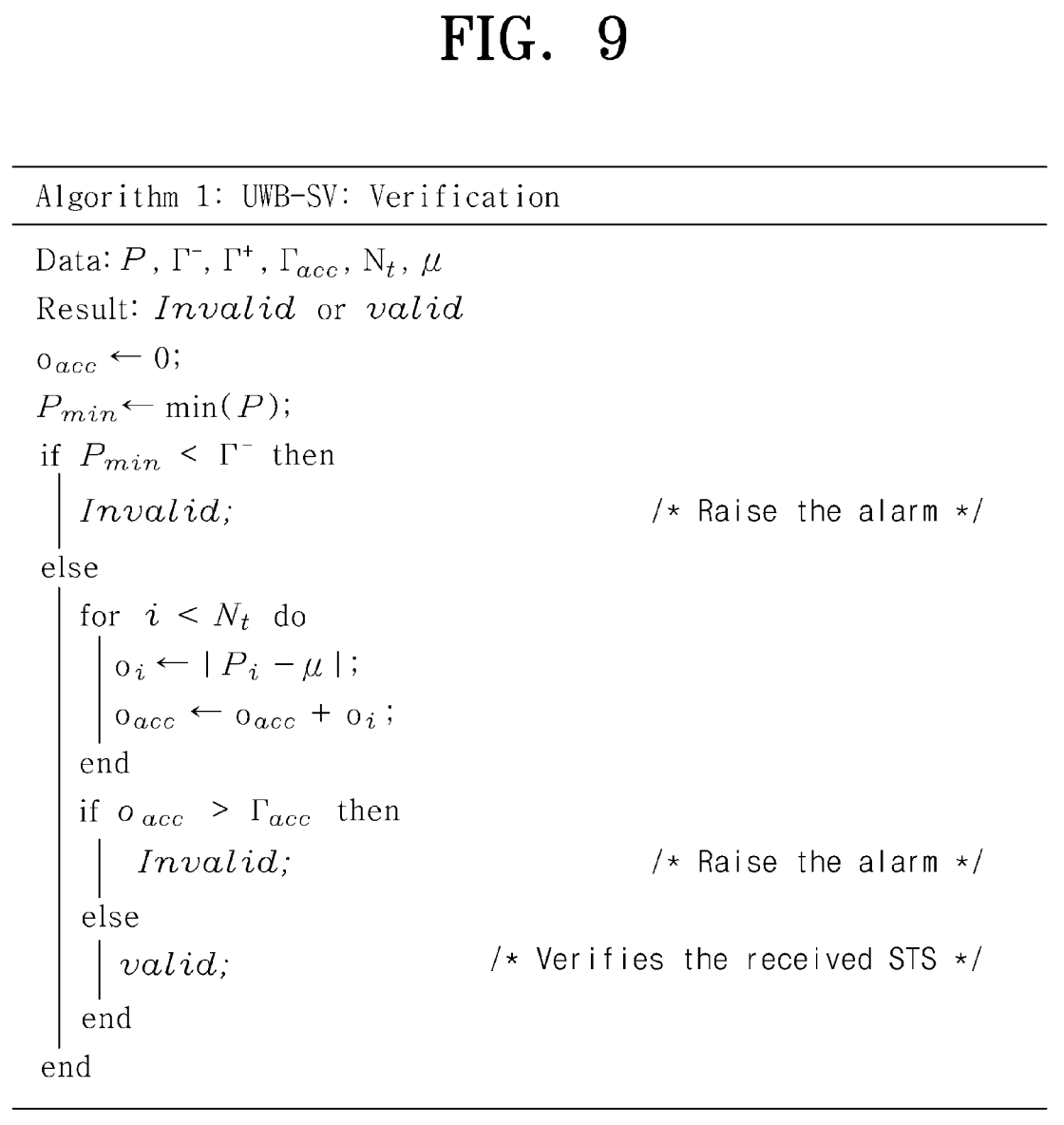

Algorithm 1: UWB-SV: Verification

---

Data: $P$, $\Gamma^-$, $\Gamma^+$, $\Gamma_{acc}$, $N_t$, $\mu$

Result: *Invalid* or *valid*

$o_{acc} \leftarrow 0;$ $P_{min} \leftarrow \min(P);$ if $P_{min} < \Gamma^-$ then

*Invalid;*                       /* Raise the alarm */ else for $i < N_t$ do $o_i \leftarrow |P_i - \mu|;$ $o_{acc} \leftarrow o_{acc} + o_i;$ end if $o_{acc} > \Gamma_{acc}$ then

*Invalid;*                  /* Raise the alarm */ else

*valid;*         /* Verifies the received STS */ end end

---

DEVICE AND METHOD OF DETECTING FOR HRP UWB RANGING AGAINST DISTANCE REDUCTION ATTACKS

CROSS REFERENCE TO RELATED APPLICATION

The present application claims priority to Korean Patent Application No. 10-2022-0113048, filed on Sep. 6, 2022, the entire contents of which is incorporated herein for all purposes by this reference.

BACKGROUND OF THE INVENTION

Field of the Invention

The disclosure relates to a device and method for detecting a distance reduction attack on a positioning system based on ultra-wide band (UWB) technology.

Description of the Related Art

Ultra-wideband (UWB) technology refers to a radio communication technology that performs data communication with short pulse signals of 1 to 2 ns, using a wide bandwidth channel of 500 MHz. Because UWB can achieve a highly accurate time of arrival (ToA) measurement even under a multi-path channel, a distance measurement function between devices of centimeter-level ranging can be provided by measuring time of flight (ToF) or time difference of arrival (TDoA).

According to the IEEE 802.15.4z standard for UWB communication, two operation modes are defined: low rate pulse (LRP) and high rate pulse (HRP). The LRP mode uses fewer pulses with high power, while the HRP mode uses more pulses with low power.

UWB technology can be applied to services such as vehicle smart keys and access tags by providing a positioning function by measuring a difference in time of arrival (ToA) of signals between transmitting and receiving terminals. However, it has recently been found that distance reduction attacks against the positioning system are possible by exploiting the deterministic nature of the physical level structure of the UWB signal.

A defense technique of distance reduction attack has been proposed for the LRP mode in which a single pulse is easily identified because it uses a pulse of strong power, but the corresponding security technique cannot be applied to the HRP mode. Therefore, the disclosure is to propose a security technique for distance reduction attack that can be applied to the HRP mode.

SUMMARY OF THE INVENTION

The technical object to be achieved by the disclosure is to provide a device and method for detecting distance reduction attack in an UWB HRP mode.

An embodiment of the disclosure provides a method for detecting distance reduction attack which is performed by a receiver or transmitter operating in an ultra-wide band (UWB) high rate pulse (HRP) mode. The method comprises receiving a message frame targeted for distance reduction attack; splitting a scrambled timestamp sequence (STS) field included in the message frame into a plurality of sub-fields; computing a correlation between each of the sub-fields and a corresponding sub-template among a plurality of sub-templates split from a local template; extracting a plurality of maximum peaks, each corresponding to each of the correlations; and detecting the distance reduction attack based on extracted maximum peaks.

The device and method for detecting distance reduction attack according to an embodiment of the disclosure has an effect of effectively detecting distance reduction attack in an ultra-wide band high rate pulse (UWB HRP) mode.

BRIEF DESCRIPTION OF THE DRAWINGS

FIG. 4 illustrates the preamble field, SFD field, STS field that an attacker transmits.

FIG. 9 shows an algorithm for verification.

DETAILED DESCRIPTION OF THE INVENTION

Figure 1:
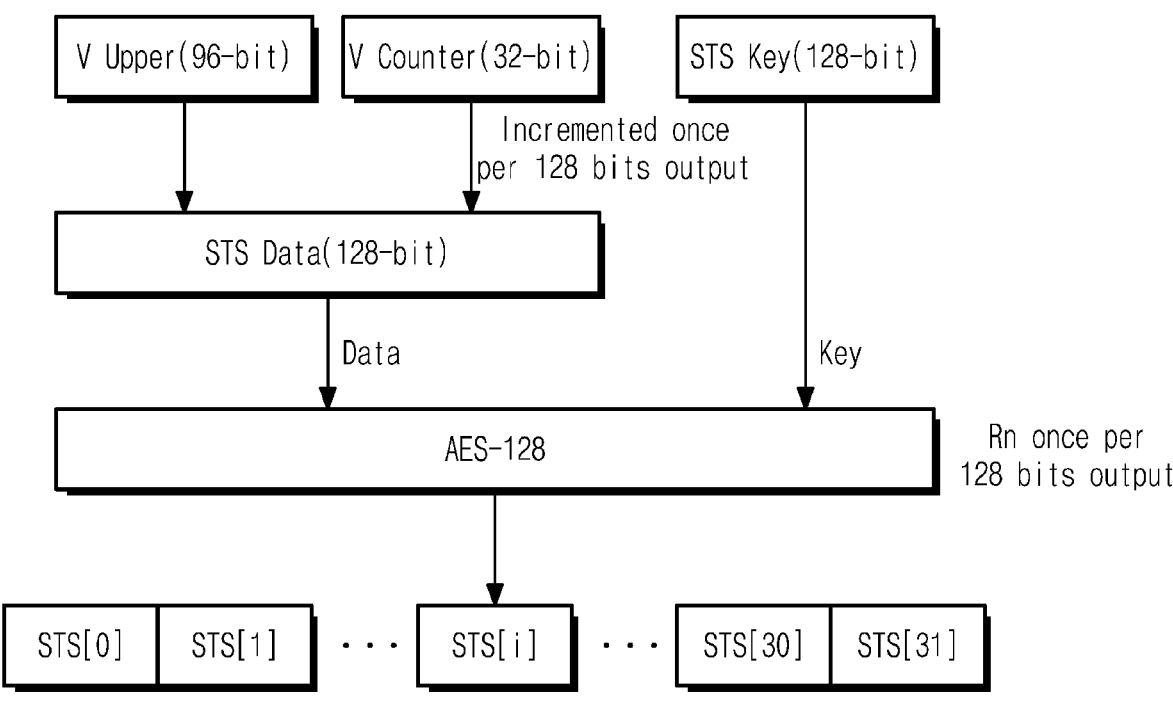
FIG. 1 is a conceptual diagram to explain an STS generation procedure.

Disclosed hereinafter are exemplary embodiments of the present invention. Particular structural or functional descriptions provided for the embodiments hereafter are intended merely to describe embodiments according to the concept of the present invention. The embodiments are not limited as to a particular embodiment.

Terms such as "first" and "second" may be used to describe various parts or elements, but the parts or elements should not be limited by the terms. The terms may be used to distinguish one element from another element. For instance, a first element may be designated as a second element, and vice versa, while not departing from the extent of rights according to the concepts of the present invention.

Unless otherwise clearly stated, when one element is described, for example, as being "connected" or "coupled" to another element, the elements should be construed as being directly or indirectly linked (i.e., there may be an intermediate element between the elements). Similar interpretation should apply to such relational terms as "between", "neighboring," and "adjacent to."

Terms used herein are used to describe a particular exemplary embodiment and should not be intended to limit the present invention. Unless otherwise clearly stated, a singular term denotes and includes a plurality. Terms such as "including" and "having" also should not limit the present invention to the features, numbers, steps, operations, subparts and elements, and combinations thereof, as described; others may exist, be added or modified. Existence and addition as to one or more of features, numbers, steps, etc. should not be precluded.

Unless otherwise clearly stated, all of the terms used herein, including scientific or technical terms, have meanings which are ordinarily understood by a person skilled in the art. Terms, which are found and defined in an ordinary dictionary, should be interpreted in accordance with their usage in the art. Unless otherwise clearly defined herein, the terms are not interpreted in an ideal or overly formal manner.

Example embodiments of the present invention are described with reference to the accompanying drawings. However, the scope of the claims is not limited to or restricted by the example embodiments. Like reference numerals proposed in the respective drawings refer to like elements.

An ultra-wide band (UWB) technology supports two operation modes, low rate pulse (LRP) and high rate pulse (HRP). In both operation modes, different pulse repetition frequencies (PRFs) are assigned. PRF determines a space between two consecutive pulses. Also, in the two operation modes, modulation schemes for determining a physical layer symbol structure are also different.

In the LRP mode, on-off-keying (OOK), pulsed binary frequency shift keying (PBFSK), or PBFSK-pulse position modulation (PBFSK-PPM) can be used to represent binary information.

In the HRP mode, a symbol (or frame) is given a large number of pulses compared to the LRP mode. At the same time, to comply with the power spectral density regulation, individual pulses in the HRP mode have a lower power than in the LRP mode. Therefore, a receiver must aggregate the energy from the pulses within a certain time window. However, the detailed receiving mechanism differs from manufacturer to manufacturer and remains unknown.

The HRP UWB packet may be composed of different segments (or fields) such as preamble, start frame delimiter (SFD), physical layer header (PHR), and data payload. In the physical layer header (PHR) and payload field, burst position modulation-binary phase shift keying (BPM-BPSK), which represents a symbol using pulse position and polarity, is used. In addition, the recent IEEE 802.15.4z standard introduced a scrambled timestamp sequence or secure training sequence (STS) field to support a secure ranging service. In the STS field, binary phase shift keying (BPSK) modulation is employed to represent a bit sequence generated from a deterministic random bit generator (DRBG). As illustrated in FIG. 1, DRBG may be implemented with the advanced encryption standard (AES)-128 algorithm using a pre-shared secret key and counter. A positive polarity pulse represents a bit '0' (or bit '1'), while a negative polarity pulse represents a bit '1' (or bit '0'). That is, a single STS field may have a constant number of pulses (e.g., 4,096 pulses). In the standard, these pulses are sent with a pulse repetition frequency (PRF) of 62.4 or 124.8 MHz. When the STS field is employed, only the legitimate receiver that shares a secret key can measure a valid ToA from a correlation with a local template. Table 1 summarizes the packet structure (SP) standardized in IEEE 802.15.4z and modulation schemes for each field.

TABLE 1

| | Preamble | SFD | STS | PHR | Payload |
|---|---|---|---|---|---|
| SP0 | √ | √ | √ | √ | √ |
| SP1, SP2 | √ | √ | — | √ | √ |
| SP3 | √ | √ | √ | — | — |
| Modulation | Ternary code | Ternary code | BPSK | BPM-BPSK | BPM-BPSK |

√: used,
—: unused
Hereinafter, HRP UWB ranging will be described.

Two-Way Ranging.

Figure 2A:
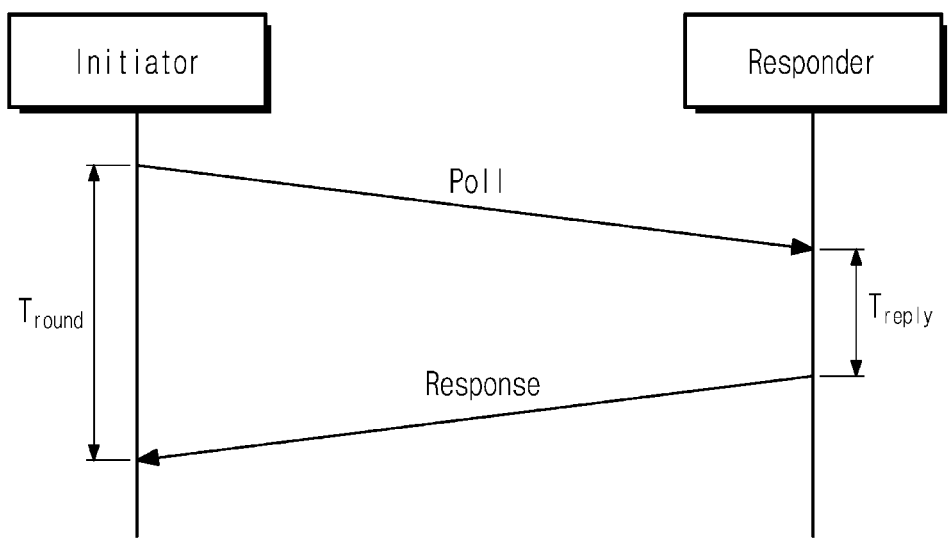
FIG. 2A shows a message flow in SS-TWR.

The IEEE 802.15.4z standard defines ranging methods such as single-sided two-way ranging (SS-TWR) and double-sided two-way ranging (DS-TWR). FIG. 2A shows the message flow in SS-TWR. Each device precisely measures the transmission and reception times of the message packets. Thus, each device may calculate $T_{round}$ and $T_{reply}$ by simple subtraction. The resultant distance $c \cdot \hat{T}_{prop}$ may be computed as in Equation 1.

$$\hat{d} = c \cdot \hat{T}_{prop} = \frac{c}{2}(T_{round} - T_{reply}) \qquad \text{[Equation 1]}$$

Figure 2B:
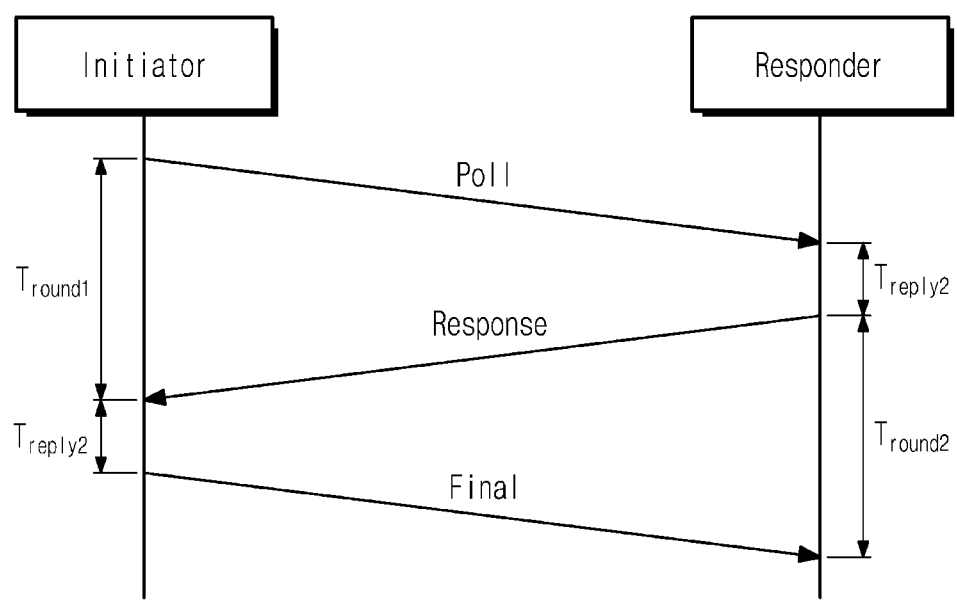
FIG. 2B shows a message flow in DS-TWR.

In Equation 1, the c refers to the propagation speed of a signal or the speed of light. However, SS-TWR may be affected by a clock frequency offset between the initiator and the responder. DS-TWR is an enhanced version of SS-TWR. Two round-trip time measurements are employed to compute the time of flight (ToF) with a reduced error in the presence of a clock frequency offset between two devices. As shown in FIG. 2B, DS-TWR may mitigate the clock offset by transmitting multiple messages. It is understood that DS-TWR performs SS-TWR twice in opposite directions. $T_{reply}$ and $T_{round}$, which are measured by both devices, may significantly reduce errors induced by clock offset and drift. As a result, the distance ($\hat{d}$) may be computed as in Equation 2.

$$\hat{d} = c \cdot \hat{T}_{prop} = c \cdot \frac{T_{round1} \cdot T_{round2} - T_{reply1} \cdot T_{reply2}}{T_{round1} + T_{round2} + T_{reply1} + T_{reply2}} \qquad \text{[Equation 2]}$$

ToA Estimation in HRP UWB.

At the RF receiver, an incoming signal is passed through an analog-to-digital converter (ADC) and sampled, which are then used as input for a correlator. The correlator computes a correlation between the incoming signal and its local template that consists of the expected signal structure. If the output of the correlator exceeds a certain level, the receiver registers that it has received a signal and starts synchronization. Before the IEEE 802.15.4z which standardized the STS field for the first time, the UWB receiver relied on the SFD field for ToA measurement. When the receiver computes the correlation of an incoming SFD and an expected SFD template, a single distinct peak is formed. However, since the Preamble and SFD are public sequences, an attacker may predict physical pulses and manipulate them easily.

Figure 3A:
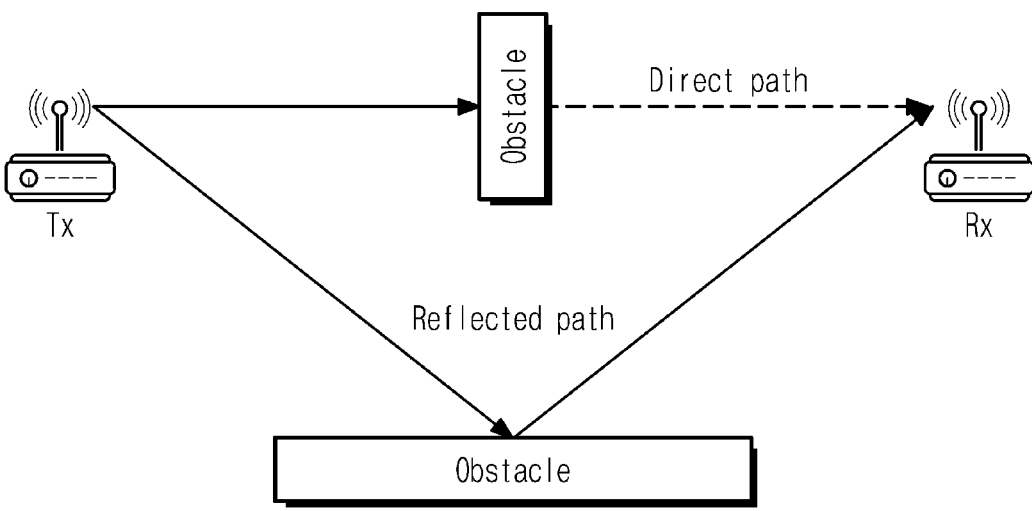
FIG. 3A and FIG. 3B show an example scenario requiring a back-search algorithm.
Figure 3B:
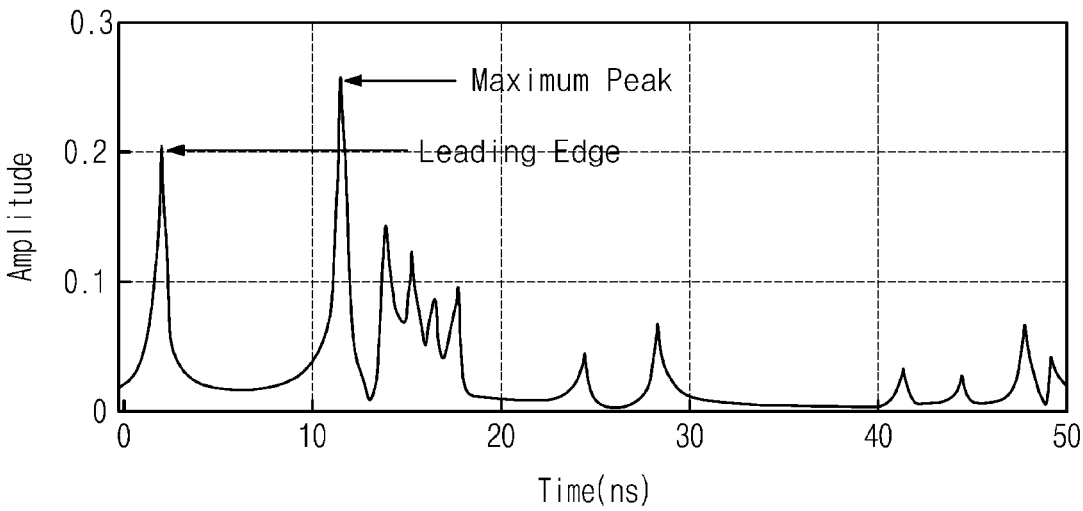

In the 802.15.4z amendment, an STS field was standardized to provide enhanced secure ranging capabilities for the HRP mode. When UWB devices employ the STS field, only a legitimate device holding an identical STS template can extract a single distinct peak that corresponds to the ToA. However, the correlator output (i.e., channel impulse response (CIR)) shows a single distinct peak only when there is no obstacle between the transmitter and the receiver (i.e., none-line-of-sight (LoS) channel). In real-world, however, several distinct peaks can occur due to the multi-path effect, a propagation phenomenon in which transmitted signals reach the receiver by two or more paths. Therefore, the receiver must employ a proper mechanism to identify a first path (i.e., leading edge) under a multi-path channel environment. FIG. 3A and FIG. 3B show an example scenario requiring a back-search algorithm. In general, once the receiver detects a maximum correlation peak, it needs to compare it with any other peak in the vicinity. A time window that specifies a search region is referred to as a back-search time window. Since a channel delay spread in UWB is between 100 ns (indoors) and 300 ns (outdoors), the receiver can assume that, as soon as a peak is detected, any other peaks of interest (with lower magnitude) must have arrived within a window of 100 ns to 300 ns before the strongest peak. However, since the ToA estimation algorithm is an unknown know-how of the manufacturer, it is assumed that a leading edge is detected by searching for a smaller correlation peak within a back-search window from the maximum correlation peak. In particular, two thresholds are assigned to identify a leading edge from a noise. Leading edge candidates within a back-search window are represented as $(\tau_i, P_i)$. Here, a $\tau$ refers to an index of peak and P represent the amplitude. To determine the actual leading edge, there are two threshold parameters: maximum peak to earlier peak ratio (MPEP) and peak to average power ratio (PAPR). The MPEP prescribes the amplitude of a leading edge based on the maximum peak, while the PAPR prescribes the amplitude of a leading edge based on the average power ratio. An actual leading edge therefore has an amplitude so that the difference between the maximum peak is less than MPEP, but the difference between the average power is larger than PAPR. As a result, leading edge index $\tau_{le}$ is defined in Equation 3.

$$\tau_{le} = \min_{\tau_i}\left(\frac{P_{max}}{P_i} < MPEP \wedge \frac{P_i}{P_{rms}} > PAPR\right) \qquad \text{[Equation 3]}$$

In the following, a threat model for distance measurement using HRP UWB is described.

An attacker is assumed to be able to reduce the distance measurement by manipulating the STS field of the HRP UWB frame. For a clear understanding of the disclosure (UWB-SV), the attacker's capabilities, target frame, and attack scenarios are described.

Attacker's Capabilities

Figure 4:
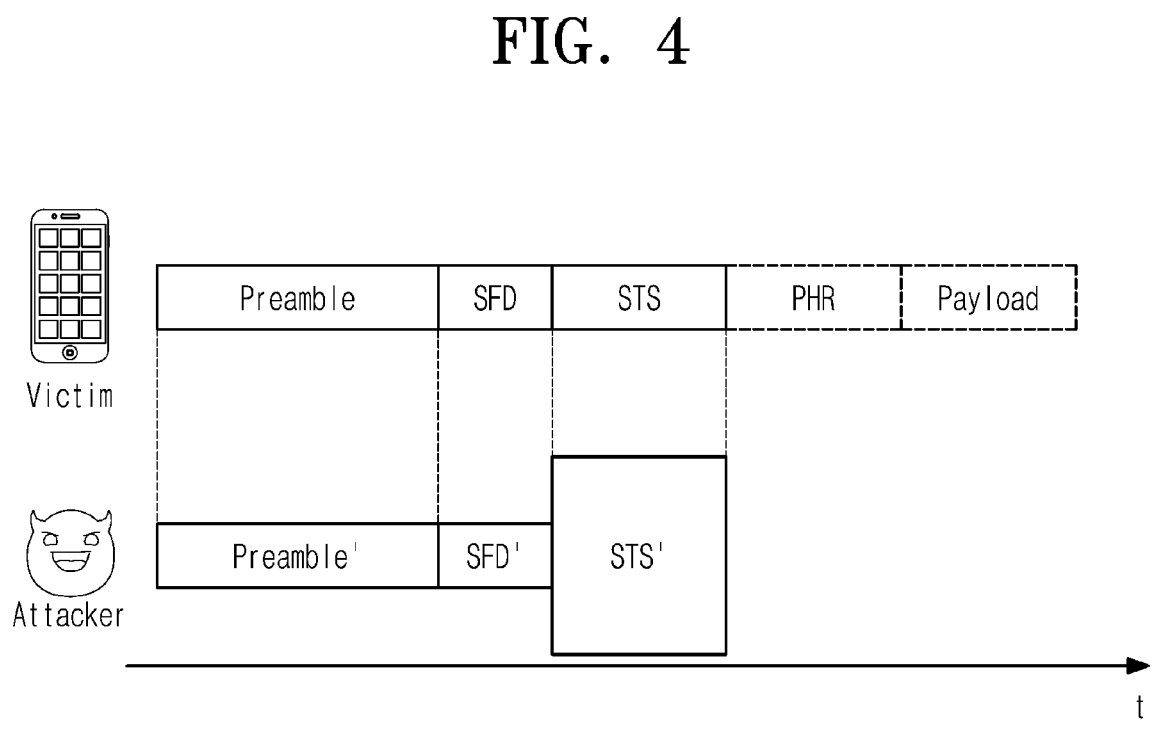

An attacker in the threat model is assumed to be able to manipulate the STS field of an HRP UWB frame so that the measured distance becomes reduced. Due to a correlation-based method, which does not verify individual pulses, the attacker can have a responder measure an invalid ToA without knowing the random number in the STS field. With strong pulses, the attacker is able to overshadow the original pulses and therefore manipulate the STS field. Since the HRP UWB frames are transmitted every few ms, the attacker needs to synchronize to a legitimate frame. The attacker transmits the preamble field and the SFD field with low power so as not to trigger a new receive event. However, the STS field that has an incorrect random number (invalid random number) should be transmitted with strong power. At this point, it is assumed that the attacker and the target device have a zero time offset and a zero carrier frequency offset. This assumption enables the attacker to manipulate the original STS field without any timing error or frequency error. FIG. 4 illustrates the preamble field, SFD field, STS field that that the attacker transmits.

Also, it is assumed that an advanced attacker knows the parameters used for leading edge detection, such as MPEP, PAPR, and back-search window size. Given these parameters, the advanced attacker is able to precisely reduce a distance in an adaptive way.

Target Frame

Four different types of a target frame are described. There are two ranging protocols in the HRP UWB: the SS-TWR protocol and the DS-TWR protocol. For the SS-TWR ranging protocol, the response frame should be a target. Referring to Equation 1, when a victim (i.e., initiator) measures a reduced ToA by $\delta$, a reduced distance is computed by Equation 4.

$$\hat{d}_{attack} = \frac{c}{2}(T_{round} - \delta - T_{reply}) = \hat{d} - \frac{c}{2} \cdot \delta \qquad \text{[Equation 4]}$$

In Equation 4, $\hat{d}$ refers to the distance computed by Equation 1.

For the DS-TWR ranging protocol, the response frame and/or the final frame can be a target. In this case, depending on the frame to be targeted, the reduced distance varies. The distance can be measured as the average of the two rounds in the DS-TWR ranging protocol. In addition, $\hat{d}$ in Equation 2 can be simplified as in Equation 5.

$$\hat{d} = c \cdot \hat{T}_{prop} = \frac{c}{4}(T_{round1} + T_{round2} - T_{reply1} - T_{reply2}) \qquad \text{[Equation 5]}$$

When the response frame in the DS-TWR protocol becomes a target, $T_{round1}$ and $T_{round2}$ are decreased by $\delta$. Therefore, the reduced distance is computed as in Equation 6.

$$\hat{d}_{attack} = \frac{c}{4}(T_{round1} - \delta + T_{round2} - \delta - T_{reply1} - T_{reply2}) \qquad \text{[Equation 6]}$$
$$= \hat{d} - \frac{c}{4} \cdot 2 \cdot \delta$$

When the attacker targets the response frames in the SS-TWR protocol and the DS-TWR protocol, the reduced distances become identical. Accordingly, an attack against the response frame in either the SS-TWR protocol or the DS-TWR protocol may be referred to as a $2\delta/4$ attack. On the other hand, when the attacker targets the final frame in the DS-TWR protocol, the $T_{round2}$ is only decreased by $\delta$. Therefore, the manipulated distance is computed as in Equation 7.

$$\hat{d}_{attack} = \frac{c}{4}(T_{round1} + T_{round2} - \delta - T_{reply1} - T_{reply2}) = \hat{d} - \frac{c}{4} \cdot \delta \qquad \text{[Equation 7]}$$

Therefore, an attack against the final frame in the DS-TWR protocol may be referred to as a $\delta/4$ attack. Finally, when the response and final frames are manipulated simultaneously, both $T_{round1}$ and $T_{round2}$ are decreased by $\delta$ and $2 \cdot \delta$, respectively. Therefore, the reduced distance is computed as in Equation 8.

$$\hat{d}_{attack} = \frac{c}{4}(T_{round1} - \delta + T_{round2} - 2 \cdot \delta - T_{reply1} - T_{reply2}) \qquad \text{[Equation 8]}$$
$$= \hat{d} - \frac{c}{4} \cdot 3 \cdot \delta$$

Therefore, an attack that targets both the response and final frames in the DS-TWR protocol may be referred to as a $3\delta/4$ attack.

Attack Scenarios

The attacker's goal is to manipulate the STS field and create a fake leading edge. Accordingly, the responder measures a reduced ToA. To manipulate the STS field, the attacker overshadows the original STS field with a STS field that has stronger power. Hereinafter, two possible attack scenarios are presented.

Blind Attack.

A blind attack overshadows the STS field with random pulses to induce a reduced ToA measurement. The STS field includes a pseudo random number that is generated based on a symmetric key securely shared between an initiator and a responder. Even though the attacker does not have the symmetric key, the attacker still may attempt to overshadow the STS field with arbitrary pulses (i.e., arbitrary values). Since the correlation-based method does not verify individual pulses, the arbitrary pulses can create a fake leading edge that causes a reduced ToA measurement at the receiver. However, a blind attack is not always successfully, and it is difficult to estimate the reduced distance.

Figure 5A:
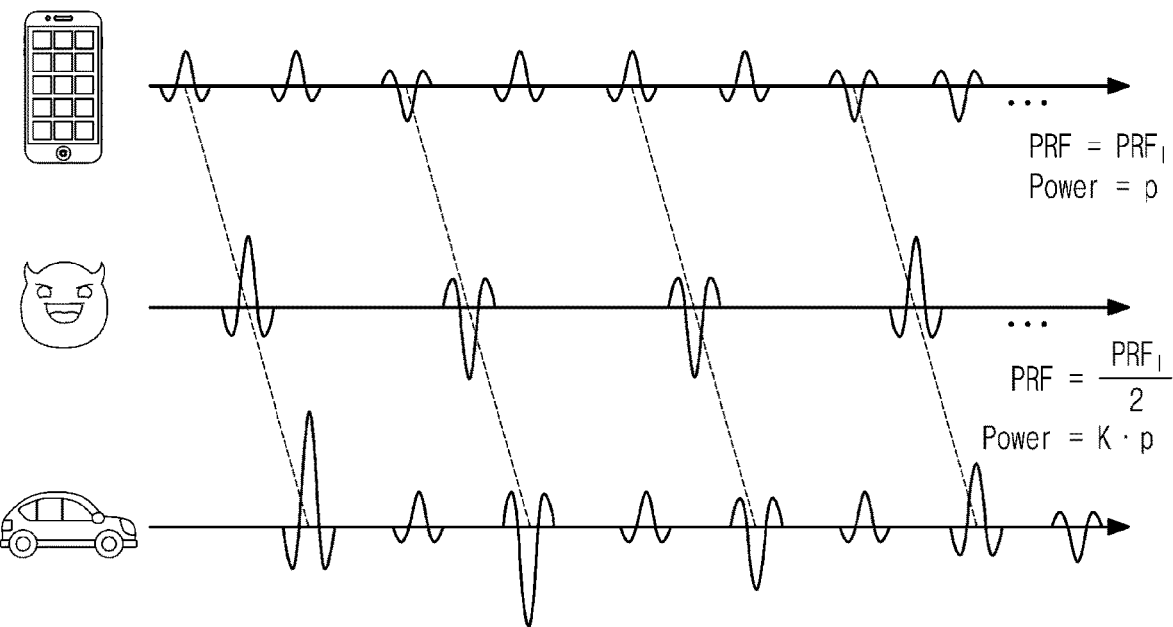
FIG. 5A and FIG. 5B show an example of attack scenario.
Figure 5B:
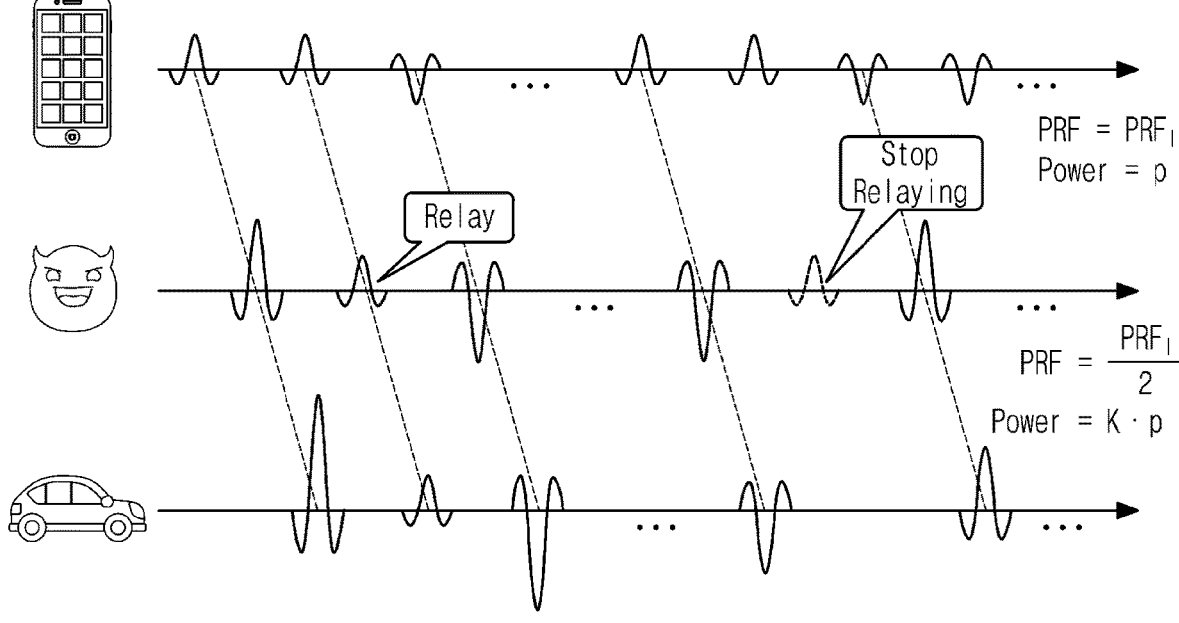

To manipulate the STS field through overshadowing, the attacker must make a decision regarding how many arbitrary pulses are to be transmitted with strong power. In this regard, the attack pulses may be modeled as a function of their frequency and their signal strength. One example of a blind attack is the Cicada++ attack (Mridula Singh, Marc Roeschlin, Ezzat Zalzala, Patrick Leu, and Srdjan Capkun. 2021. Security analysis of IEEE 802.15. 4z/HRP UWB time-of-flight distance measurement. In Proceedings of the 14th ACM Conference on Security and Privacy in Wireless and Mobile Networks. 227-237.) The Cicada++ attack is directed to legitimate pulses transmitted with a PRF of $PRF_l$ and a power of p. When the attacker selects attack parameters R and K, the corresponding attack pulses have a PRF of $(PRF_l)/R$ MHz, and the power of the pulse is K·p as shown in FIG. 5A and FIG. 5B.

Adaptive Attack.

Compared with the blind attack, in which the attacker is not able to exactly estimate a reduced distance, the attacker in an adaptive attack is able to estimate the reduced distance. By observing the transmitted STS field, the attacker is able to estimate a local template, which is an input of the correlation computation. Accordingly, the attacker adaptively selects a pulse polarity so that a location where a fake leading edge will be created can be estimated. Singh et al. introduced an adaptive injection attack for distance reduction in the HRP UWB (Mridula Singh, Patrick Leu, and Srdjan Capkun. 2017. UWB with pulse reordering: Securing ranging against relay and physical-layer attacks. Cryptology ePrint Archive (2017).). The attacker's goal is to inject a fake leading edge at $\alpha + \epsilon$ ns earlier than the legitimate leading edge. The adaptive injection attack may occur when the legitimate device is more than 20 m away from the NLoS channel. This is because the two devices can only communicate over relay. FIG. 5B show the physical layer pulses under adaptive attack scenario.

Figure 6:
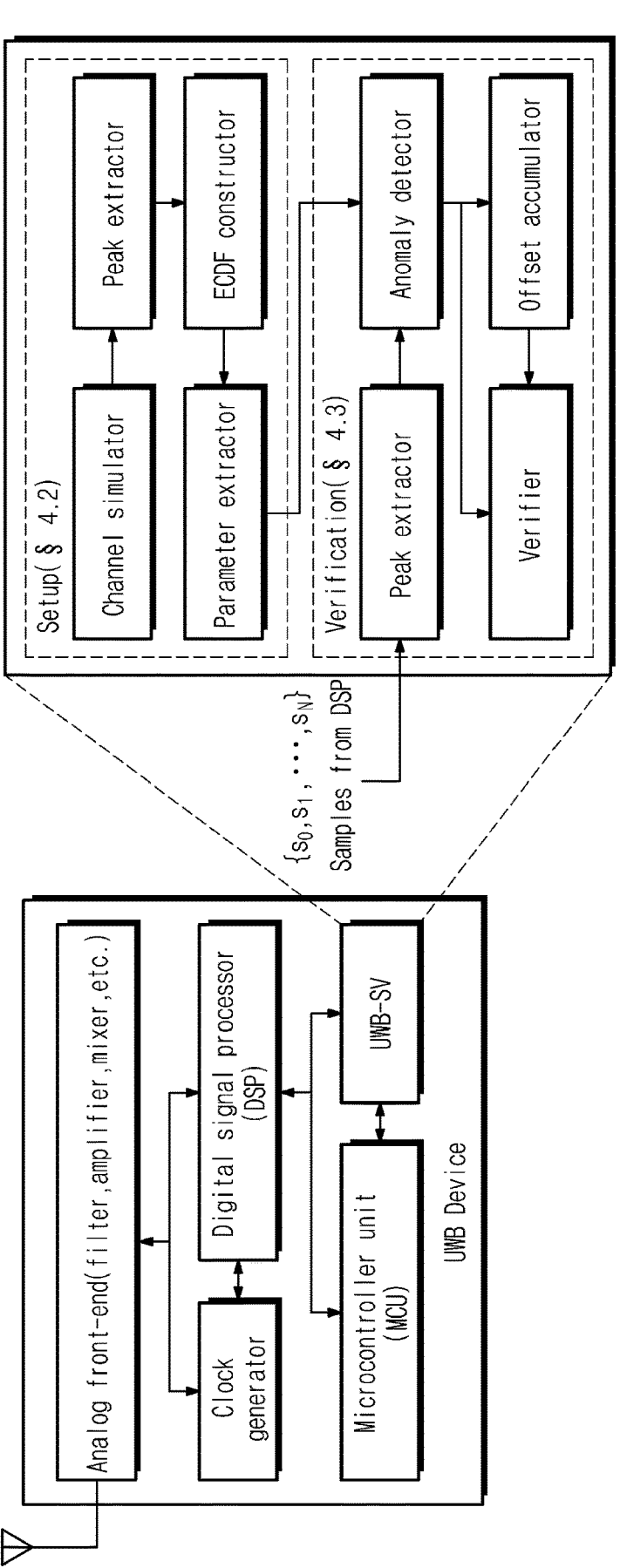
FIG. 6 shows an architectural schematic diagram of a device for detecting a distance reduction attack according to an embodiment of the disclosure.

FIG. 6 shows an architectural schematic diagram of a device for detecting a distance reduction attack according to an embodiment of the disclosure.

UWB-SV (which may be referred to as a detector or a detection module) may verify whether an STS field includes a pseudo random number that is generated based on a shared symmetric key. For the verification, UWB-SV splits a whole STS field into multiple sub-fields and computes correlations with corresponding sub-templates. As shown in FIG. 6, SWB-SV may receive raw signal samples (i.e., I/Q samples) from a digital signal processor (DSP). If an incorrect pseudo random number is detected in the STS field, UWB-SV may transfer the detection result to a microcontroller unit (MCU). Based on the detection result, the MCU may verify the received STS or generate an alarm.

In addition, it is understood that the device for detecting a distance reduction attack, which can be implemented as a computing device including at least a processor and/or a memory, includes at least one of a receiver for transmitting and/or receiving a packet (at least one of a poll frame, a response frame, a final frame), a pre-processor (Analog Front-End) for performing a preprocessing operation (e.g., at least one of filtering, amplification, and mixing operations) on the received packet, and a clock generator for generating a clock required for an operation of the device for detecting a distance reduction attack. In addition, it may be understood that a method for detecting a distance reduction attack described in this specification is performed by the device for detecting a distance reduction attack. In addition, according to an embodiment, although not shown, a storage device (which may be referred to as a storage unit) for storing data necessary for the operation of the device for detecting a distance reduction attack may be implemented as a part of the device for detecting a distance reduction attack (or a part of each component constituting the device for detecting a distance reduction attack).

In UWB-SV, at least one of two steps (operations) of setup and verification may be performed. Accordingly, it can be understood that the UWB-SV of the device for detecting a distance reduction attack includes at least one of a setup unit and a verification unit. In the Setup step (setup operation), the UWB-SV analyzes the locations of the maximum peaks in the correlations between the STS sub-fields and sub-templates, such that detection parameters are computed with the empirical cumulative distribution function (ECDF).

In the verification step, the UWB-SV verifies the received STS field, which is split into multiple sub-fields. In this case, the correlation means the correlation that is computed with local sub-templates corresponding to the split STS fields. The UWB-SV then extracts the locations of the maximum peaks for the computed correlations. With the detection parameters obtained in the setup step, locations of the maximum peaks may be verified. In a case where there is a maximum peak deviated from a particular range, the UWB-SV may consider (determine) that the STS field is invalid (i.e., manipulated). Furthermore, the UWB-SV may analyze the consistency of the locations of the maximum peaks. When a sum of location offset for the maximum peaks exceeds a particular threshold, the STS field may be also considered (determined) invalid.

The location where the UWB-SV is implemented should be determined by a target frame of attack. When an STS field of a response frame is manipulated, the UWB-SV should be implemented on an Initiator, but on the other hand (i.e., when the STS field of a final frame is manipulated), it should be deployed on a responder. If both the response frame and the final frame are targeted for distance reduction (or distance fake attack), the UWB-SV may be implemented on the initiator and/or the responder.

The setup operation (setup step) will be described in more detail.

The setup step may be performed by at least one component of Channel Simulator, Peak extractor, ECDF constructor, and Parameter extractor. That is, the setup unit may include may include at least one of Channel Simulator, Peak extractor, ECDF constructor, and Parameter extractor.

The channel simulator provides various channel conditions based on a statistical model so that propagation profiles for each condition can be modeled. Specifically, a propagation delay due to NLoS channel conditions generates pulses to interfere with each other. This phenomenon causes variations in locations of the maximum peaks in the correlations between the STS sub-fields and the local sub-templates. Therefore, for robust technique against varying channel conditions, the channel simulator may simulate the received pulses convolved by the channel impulse response $CIR_{cm}[t]$ as shown in Equation 9 (or may generate received pulses convolved by the channel impulse response, or may perform convolution operation for the channel impulse response and received pulse).

$$STS'[\tau]=(STS*CIR_{cm})[t] \qquad \text{[Equation 9]}$$

In Equation 9, symbol * refers to the convolution operation.

A peak extractor splits the STS field (STS or STS') into Nt sub-fields, and their correlations with the local sub-templates are computed as in Equation 10.

$$CIR_i[\tau]=(STS_i'+LT_i)[t] \text{ where } i=0, 1, \ldots, N_t-1 \qquad \text{[Equation 10]}$$

Figure 7:
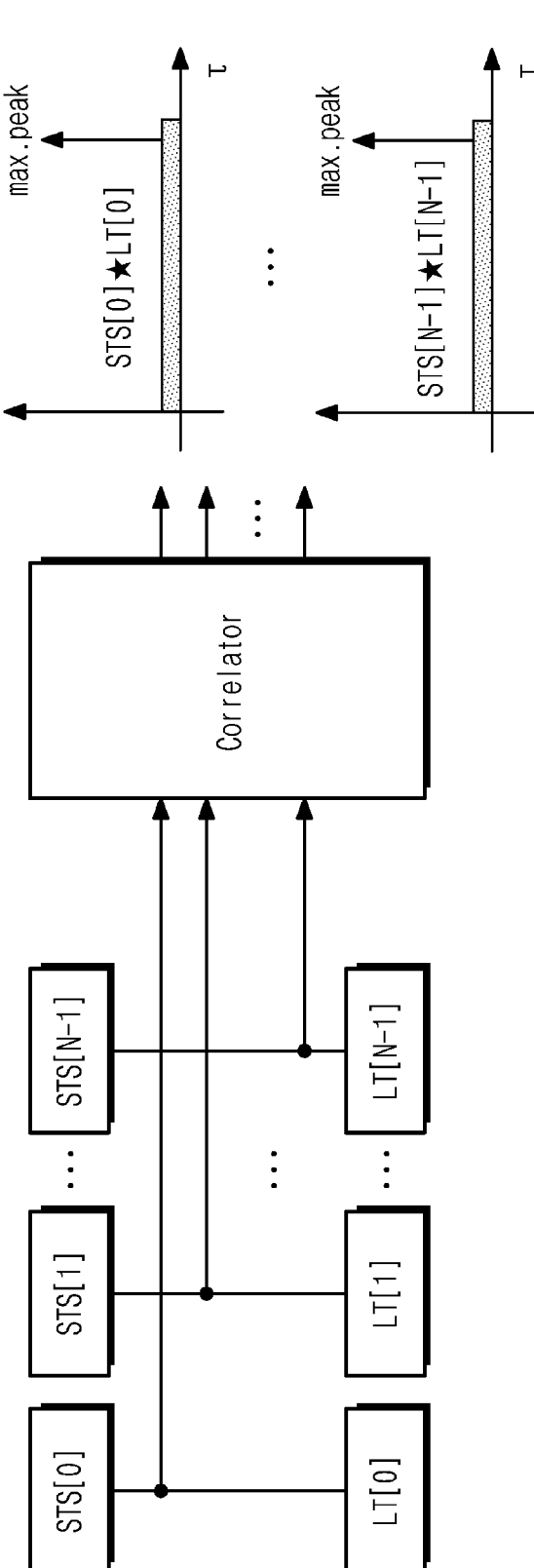
FIG. 7 is a diagram for explaining a correlation computation process in a peak extractor.

In Equation 10, symbol ★ refers to the correlation operation. The local sub-templates $LT_i$ consist of $N_s$ samples (i.e., $LT_i=s_0, s_1, \ldots, N_s-1$). In this case, the number of split sub-fields and the number of split local sub-templates may be the same. That is, t and s may be natural numbers of the same value. If the correlations are computed, the peak extractor extracts the locations of the maximum peaks as shown in FIG. 7. The location information of maximum peaks is collected, and the peak extractor conveys the set of peak indices $P=\{p_0, p_1, \ldots, P_{N_t}-1\}$ to an ECDF constructor.

The ECDF constructor analyzes the location distribution of the maximum peaks. Depending on channel conditions and the sequence of the sub-fields, the maximum peaks should be observable in different locations. To cover all these effects, an ECDF (empirical cumulative distribution function) where each maximum peak is observed is constructed.

Finally, with the ECDF, the parameter extractor configures detection parameters to be used in the verification step. At least one of two types of detection parameters is defined. The first type is characterized as lower and upper bounds, which are denoted by $\Gamma^-$ and $\Gamma^+$, respectively. These parameters are set to the indices where the ECDF values are 0 and 0.9973 (or 1). However, the scope of the disclosure is not limited to the specific value of the ECDF value, and a value having an error between 0 and a predetermined range or a value having an error between 0.9973 and a predetermined range may be selected.

The second type of parameter is denoted as $\Gamma_{acc}$, which is used to check the location consistency of the maximum peaks. Through a heuristic analysis, $\Gamma_{acc}$ may be simplified as $\Gamma_{acc}=N_t\cdot\lambda\cdot(\Gamma^+-\Gamma^-)$. Here, $\lambda$ refers to the sensitivity parameter that determines the benign range (which may mean a normal range).

The setup step described above may mean an operation targeting an unmanipulated STS field. This is to derive a detection parameter targeting only normal data that has not been manipulated. Therefore, if the detection parameters are predetermined, the setup unit may be omitted from the device for detecting distance reduction attack. In this case, the verification operation may be performed based on previously stored detection parameters. However, the disclosure is not limited thereto, and the setup step may be performed for the received STS field (in real time).

Hereinafter, the verification step (verification operation) will be described in more detail.

With the detection parameters configured in the setup step (or previously stored detection parameters), the UWB-SV may conduct at least one of two processes in the verification step. In particular, the verification step may be conducted by at least one component of a peak extractor (it may be referred to as a second peak extractor to be distinguished from the peak extractor included in the setup unit. Also, depending on an embodiment, the second peak extractor may mean the peak extractor in the setup unit), an anomaly detector, a verifier, and an offset accumulator. That is, the verification unit may include at least one of the second peak extractor, the anomaly detector, the verifier, and the offset accumulator.

The second peak extractor may split the received STS field into a plurality of sub-fields having a predetermined number (e.g., $N_t$ number), and compute the correlation between each of the plurality of sub-fields and a corresponding sub-template among the plurality of sub-templates.

The anomaly detector may determine whether the STS field (or target frame) is abnormal based on the correlations derived by the second peak extractor. Whether there is an abnormality is determined using the detection parameters generated by the setup unit (or previously stored sensing parameters). That is, the anomaly detector may perform at least a part of the first verification step described below to detect the existence of the maximum peak outside the range from $\Gamma^-$ to $\Gamma^+$ and transmit the detection result to the verifier.

The offset accumulator may compute distance offsets of the maximum peaks based on the correlations derived by the second peak extractor and accumulate the computed distance offsets to obtain an accumulated offset. The obtained accumulated offset may be transmitted to the verifier. That is, the offset accumulator may perform at least a part of the second verification step described below to obtain the accumulated offset and transmit the obtained accumulated offset to the verifier.

The verifier may receive the output of the anomaly detector and/or the offset accumulator and determine whether or not a distance reduction attack is performed targeting the received STS field (or received data frame) based on the received output. The verifier may determine that the distance reduction attack has occurred when there is the maximum peak outside of a predetermined interval and the accumulated offset exceeds a predetermined value. Depending on an embodiment, the verifier may determine that the distance reduction attack has occurred when there is the maximum peak outside a predetermined interval or when the accumulated offset exceeds a predetermined value.

Figure 8A:
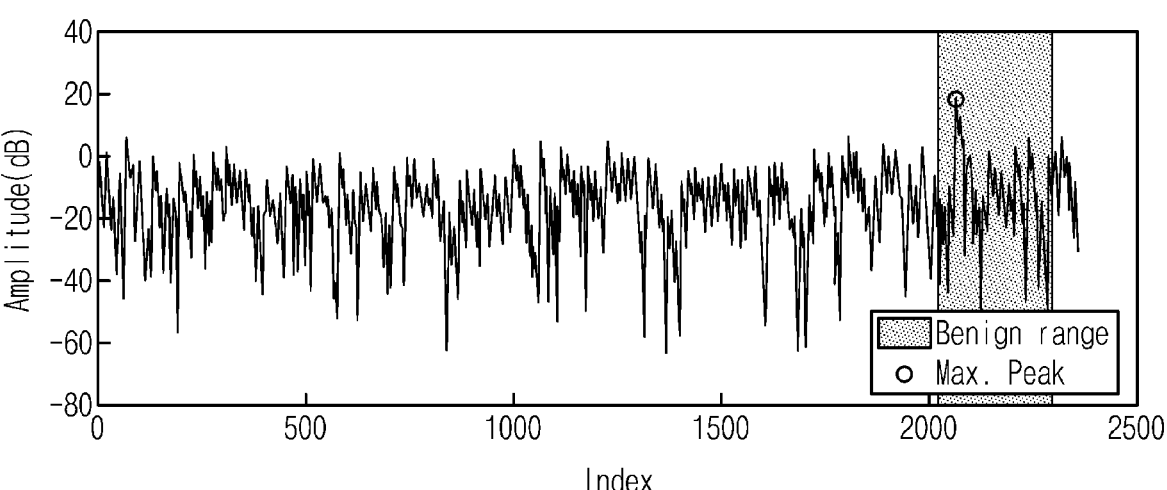
FIG. 8A shows an example of a correlation result between a valid STS sub-field and a sub-template.
Figure 8B:
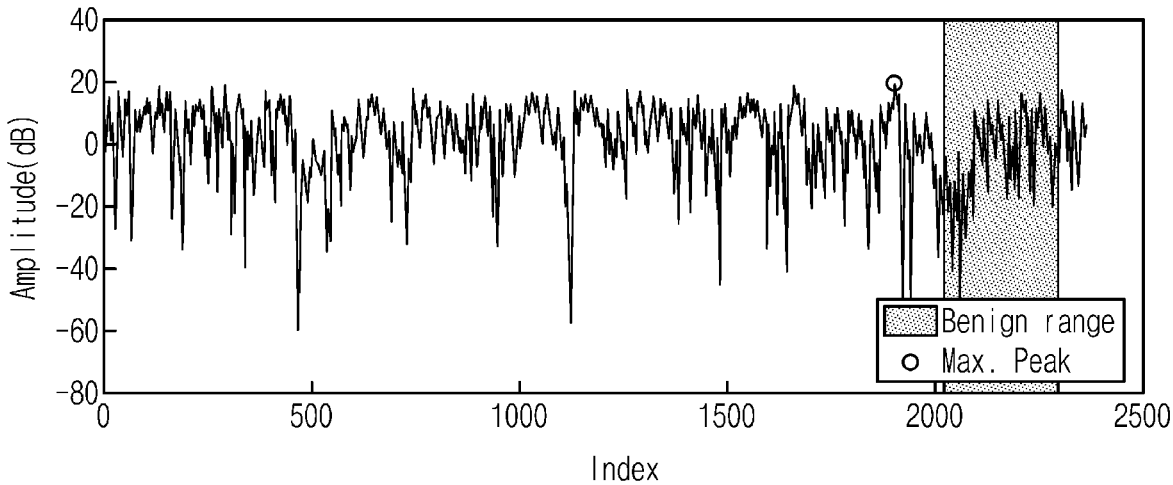
FIG. 8B shows an example of a correlation result between an invalid STS sub-field and a sub-template.

In the first verification step of two processes constituting the verification step, it may check if all maximum peaks are located above $\Gamma^-$. Since the $\Gamma^-$ refers to the earliest possible leading edge for a plurality of possible channels, if at least one maximum peak is found outside of $\Gamma^-$ (i.e., if occurred before $\Gamma^-$), it may be determined that the corresponding STS field is invalid. FIG. 8A shows an example where the maximum peak locates an interval from $\Gamma^-$ to $\Gamma^+$. On the other hand, the maximum peak from an invalid STS field is outside the interval from $\Gamma^-$ to $\Gamma^+$. In FIG. 8B, a large number of side peaks higher than 10 dB exist due to the invalid STS field.

In the second verification step of two processes constituting the verification step, the location offsets of the maximum peaks are computed from $\mu$, which correspond to the ECDF value of 0.5. If a sum of location offsets is greater than $\Gamma_{acc}$, it may determine that the corresponding STS field is invalid. FIG. 9 shows an algorithm for verification.

The aforementioned method for detecting for HRP UWB ranging against distance reduction attacks according to example embodiments may be implemented in a form of a program executable by a computer apparatus. Here, the program may include, alone or in combination, a program instruction, a data file, and a data structure. The program may be specially designed to implement the aforementioned method for detecting distance reduction attacks or may be implemented using various types of functions or definitions known to those skilled in the computer software art and thereby available. Also, here, the computer apparatus may be implemented by including a processor or a memory that enables a function of the program and, if necessary, may further include a communication apparatus.

The program for implementing the aforementioned method for detecting distance reduction attacks may be recorded in computer-readable record media. The media may include, for example, a semiconductor storage device such as an SSD, ROM, RAM, and a flash memory, magnetic disk storage media such as a hard disk and a floppy disk, optical record media such as disc storage media, a CD, and a DVD, magneto optical record media such as a floptical disk, and at least one type of physical device capable of storing a specific program executed according to a call of a computer such as a magnetic tape.

Although some example embodiments of an apparatus and method for detecting distance reduction attacks are described, the apparatus and method for detecting distance reduction attacks are not limited to the aforementioned example embodiments. Various apparatuses or methods implementable in such a manner that one of ordinary skill in the art makes modifications and alterations based on the aforementioned example embodiments may be an example of the aforementioned apparatus and method for detecting distance reduction attacks. For example, although the afore-mentioned techniques are performed in order different from that of the described methods and/or components such as the described system, architecture, device, or circuit may be connected or combined to be different form the above-described methods, or may be replaced or supplemented by other components or their equivalents, it still may be an example embodiment of the apparatus and method for detecting distance reduction attacks.

The device described above can be implemented as hardware elements, software elements, and/or a combination of hardware elements and software elements. For example, the device and elements described with reference to the embodiments above can be implemented by using one or more general-purpose computer or designated computer, examples of which include a processor, a controller, an ALU (arithmetic logic unit), a digital signal processor, a micro-computer, an FPGA (field programmable gate array), a PLU (programmable logic unit), a microprocessor, and any other device capable of executing and responding to instructions. A processing device can be used to execute an operating system (OS) and one or more software applications that operate on the said operating system. Also, the processing device can access, store, manipulate, process, and generate data in response to the execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a pro-cessing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distrib-uted over a computer system that is connected via a network, to be stored or executed in a distributed manner. The software and data can be stored in one or more computer-readable recorded medium.

A method according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present inven-tion or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., specially designed to store and execute program instructions. Examples of the program instructions may include not only machine language codes produced by a compiler but also high-level language codes that can be executed by a com-puter through the use of an interpreter, etc. The hardware mentioned above can be made to operate as one or more software modules that perform the actions of the embodi-ments of the invention and vice versa.

While the present invention is described above referenc-ing a limited number of embodiments and drawings, those having ordinary skill in the relevant field of art would understand that various modifications and alterations can be derived from the descriptions set forth above. For example, similarly adequate results can be achieved even if the techniques described above are performed in an order dif-ferent from that disclosed, and/or if the elements of the system, structure, device, circuit, etc., are coupled or com-bined in a form different from that disclosed or are replaced or substituted by other elements or equivalents. Therefore, various other implementations, various other embodiments, and equivalents of the invention disclosed in the claims are encompassed by the scope of claims set forth below.

What is claimed is:

1. A method for detecting distance reduction attack which is performed by a receiver or transmitter operating in an ultra-wide band (UWB) high rate pulse (HRP) mode, the method comprising:

receiving a message frame targeted for distance reduction attack;

splitting a scrambled timestamp sequence (STS) field included in the message frame into a plurality of sub-fields;

computing a correlation between each of the sub-fields and a corresponding sub-template among a plurality of sub-templates split from a local template;

extracting a plurality of maximum peaks, each corre-sponding to each of the correlations; and detecting the distance reduction attack based on extracted maximum peaks.

2. The method of claim 1, wherein the message frame includes any one of a response frame of single-sided two-way ranging (SS-TWR), a response frame of a double-sided two-way ranging (DS-TWR), and a final frame of the DS-TWR.

3. The method of claim 1, wherein a number of the plurality of sub-fields and a number of the plurality of sub-templates are the same.

4. The method of claim 1, wherein the detecting the distance reduction attack includes determining that the distance reduction attack has occurred when at least one of the maximum peaks is out of a predetermined location interval.

5. The method of claim 1, wherein the detecting the distance reduction attach includes:

computing a location offset from a predetermined location for each of the maximum peaks;

accumulating the computed location offset; and determining that the distance reduction attack has occurred when the accumulated location offset exceeds a predetermined threshold.

6. The method of claim 1, wherein the detecting includes operating a verifier that determines the message frame is abnormal when at least one maximum-peak location lies outside a predetermined permissible interval and also determines the message frame is abnormal when a total of location offsets of the maximum-peak locations across the plurality of sub-fields exceeds a threshold, and wherein the verifier declares a distance-reduction attack only when the at least one maximum-peak location lies outside the predetermined permissible interval and when the total of location offsets of the maximum-peak locations across the plurality of sub-fields exceeds the threshold.

* * * * *